Figure 1:
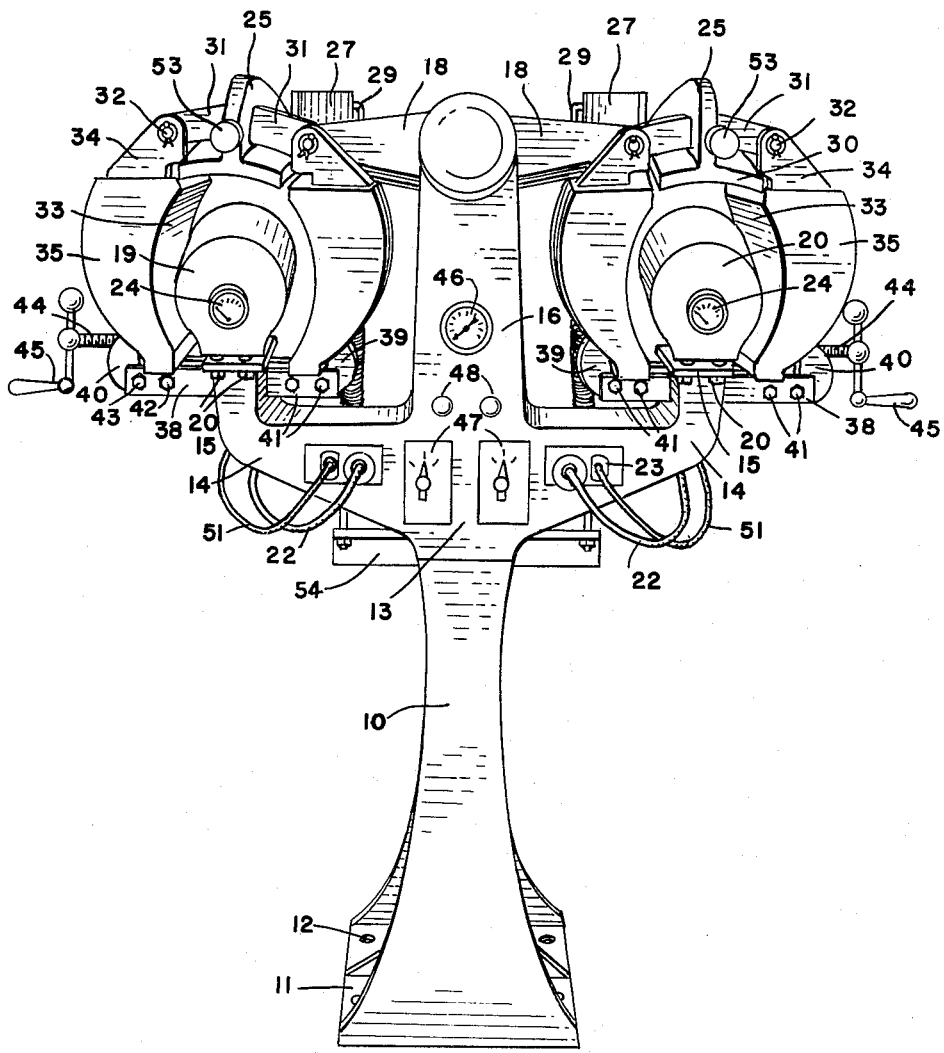

July 11, 1961 M. W. VAN SCOYK 2,991,505
TIRE VULCANIZERS
Filed Jan. 19, 1959 2 Sheets-Sheet 1

INVENTOR.
MELVIN W. VAN SCOYK
BY
ATTORNEY

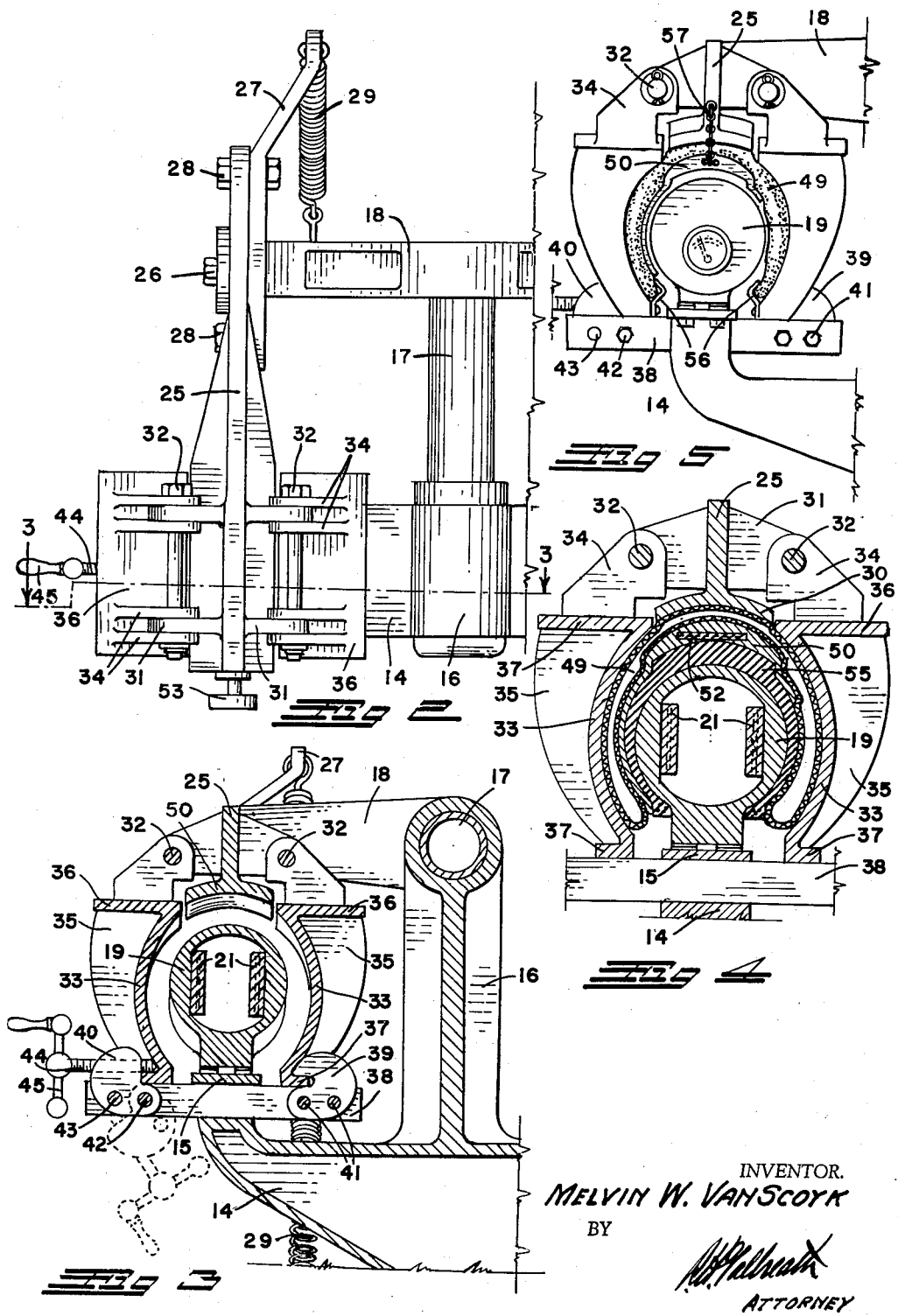

United States Patent Office 2,991,505
Patented July 11, 1961

2,991,505
TIRE VULCANIZERS
Melvin W. Van Scoyk, Arvada, Colo., assignor to Winner Manufacturing & Sales Co., Arvada, Colo.
Filed Jan. 19, 1959, Ser. No. 787,407
2 Claims. (Cl. 18—18)

This invention relates to a vehicle tire casing vulcanizer and has for its principal object the provision of a neat, highly-efficient, completely self-contained, casing repair unit of the dual type which will enable two casings to be supported and vulcanized simultaneously.

Another object of the invention is to provide a tire vulcanizer construction in which all of the casing clamping elements, when not in use, will be resiliently and automatically withdrawn from the working area so that the casings can be quickly, easily and accurately positioned without interference from machine elements and in which the clamping elements can be quickly and easily brought into clamping relation about the casing for the final curing of the repair.

A further object is to provide a casing repair vulcanizer having a fixed inner mandrel over which the casing is suspended so that it will be unnecessary for the operator to handle the hot mandrel at any time and to provide an overhead, freely-swinging, clamping hood which can be readily brought down over the suspended casing with a minimum of physical effort and without danger of injurious burns.

A still further object is to provide a vulcanizer with an external air bag and heat booster to obtain a more rapid, more accurate and more efficient cure of the repair.

Other objects and advantages reside in the detail construction of the invention, which is designed for simplicity, economy, and efficiency. These will become more apparent from the following description.

In the following detailed description of the invention, reference is had to the accompanying drawing which forms a part hereof. Like numerals refer to like parts in all views of the drawing and throughout the description.

In the drawing:
FIG. 1 is a front perspective view of the improved dual tire casing vulcanizer repair device;
FIG. 2 is a fragmentary plan view thereof;
FIG. 3 is a cross section of the portion of FIG. 2 taken on the line 3—3 in the latter figure;
FIG. 4 is a similar enlarged cross section showing a tire casing in the curing position therein; and
FIG. 5 is a front end view of an inner mandrel and curing hood, as employed in the dual tire casing vulcanizer repair device, illustrating the hood in the closed position with an external air bag and heat booster in place therein.

The improved dual tire casing repair device is supported from a cast iron supporting standard 10, of "I-beam" cross section, provided with an enlarged flat base plate 11 which may be bolted to the floor through suitable bolt holes 12. A hollow head member 13 is bolted or otherwise secured on the top of the standard 10. The head member 13 is cast as a single unit with two hollow supporting arms 14 extending oppositely outward therefrom and a central post 16 of I-beam cross section, arising vertically and medially therefrom. The supporting arms 14 terminate in upturned extremities which support horizontal, flat mounting plates 15.

A hollow, curvated, internal mandrel 19 is fixedly mounted on each of the mounting plates 15 by means of suitable cap screws 20. The internal mandrel may have any of the usual constructions. As illustrated, it is provided with internal electric heating elements 21, to which current is conducted by means of current conductors 22 plugged into electrical receptacles 23 on the front of the head member 13. The mandrels lie in parallel relation and each is provided with an easily visible temperature indicating dial 24.

A supporting shaft or tube 17 is rigidly mounted in the top of the post 16 and extends horizontally and rearwardly therefrom. A cross member 18 is rigidly formed or mounted on the rear extremity of, and in T-shaped relation to the supporting tube 17 and extends horizontally and oppositely outward therefrom.

A hood lifting lever 25, of inverted T-shaped cross section, is pivotally mounted on each extremity of the cross member 18 and each is held in place upon its pivot by means of a pivot cap screw 26.

A spring bracket 27 is secured to the rear extremity of each of the hood lifting levers 25 and extends rearwardly and inwardly therefrom. The brackets 27 may be formed as an integral part of the hood lifting levers 25 or may be attached thereto by means of suitable attachment bolts 28. A tension spring 29 is tensioned between each spring bracket 27 and a cross angle 54 mounted on and extending oppositely outward from the upper extremity of the standard 10. The tension in the springs 29 tends to lift the forward extremities of the hood lifting levers 25.

The forward extremities of the hood lifting levers 25 are formed to provide curvated tread plates 30 which form the tread portions of the two hoods and they are each further provided with two pairs of oppositely extending hinge ears 31. A hinge pin 32 extends through each pair of hinge ears 31. A cheek plate 33, curvated to conform approximately to the curves of a casing, is suspended from each of the hinge pins 32 to form the sides of the two hoods. Each cheek plate has a curvated inner face conforming approximately to the side contour of a typical casing and each cheek plate is provided with two pairs of upstanding spaced-apart hinge brackets 34 through which the hinge pins 32 extend to hingedly suspend the cheek plates 33 from the hood lifting levers 25.

The cheek plates 33 are provided with vertical, external, spaced-apart reinforcing ribs 35 which terminate in a relatively wide top flange 36 and a relatively narrow bottom flange 37. When the hoods are in their lowermost position, the bottom flanges 37, of the cheek plates 33 of each hood, rest upon a pair of parallel, draw bars 38 each pair being transversely slidable in one of the upturned extremities of the supporting arms 14. Each pair of the draw bars is maintained in parallel, spaced relation by means of an inner, stationary hook block 39 and an outer pivoted hook block 40. A pair of clamp bolts 41 secure the draw bars 38 of each pair to the opposite sides of the inner hook blocks 39 and pivot bolts 42 similarly secure the draw bars 38 of each pair to the opposite sides of the pivoted outer hook block 40.

The inner stationary hook blocks 39 are notched to receive the bottom flanges 37 of the inside cheek plates 33. The outer hook blocks 40 can be locked in their uppermost positions by means of withdrawable dowel pins 43. The hook blocks 40 are provided with threaded vise screws 44, provided with hand cranks 45, arranged to engage the outer cheek plates above their bottom flanges 37. When tightened, the vise screws 44 act to draw the inner hook blocks and the inner cheek plates outwardly and simultaneously force the outer cheek plates inwardly to rapidly and securely draw the entire hood about the casing to be repaired, indicated in cross section at 55 in FIG. 4.

The post 16 is provided with an air pressure gauge 46 and the head member 13 is provided with two timing switches 47 for timing the energization of the mandrels and with two indicating lights 48 which illuminate when the heating elements in either of the mandrels is energized.

The device is designed for use in connection with air bags 49 which cover the internal faces of the hoods and to which compressed air, as indicated by the gauge 46, can be supplied in any suitable manner. The device is also used in connection with what is herein termed a heat booster 50, as shown in FIG. 4. The heat boosters comprise curvated molded rubber shells having an inner contour corresponding to the desired tire casing contour and provided with internal electrical heating elements 52 molded therein to which current is supplied through electric cords 51.

It is believed the method of use will be apparent from the above. Briefly, the repaired casing is hung over the internal mandrel 19 with the repair uppermost. The heat booster 50 is then placed over the repair and the air bag 49 is positioned about the booster 50 and about the casing 55. The hood lever 25 is now pulled downwardly by means of a suitable hand grip knob 53 mounted thereon. The draw bars 38 are now pulled outwardly to engage the inner hook block 39 with the inner bottom flange 37 and the outer hook block 40 is swung upwardly to cause the point of the vise screw to engage the bottom flange 37.

The dowel pin 43 is now inserted to maintain the outer hook block 40 in position and the vise screw 44 is tightened, by means of the crank 45, to cause the entire hood to contract about the repaired casing. Air is now turned into the air bag 49 and current, controlled by the timing switches 47, is supplied to the elements 21 and 52 to effect the complete cure.

It is preferred to support the air bag 49 in the hood upon supporting clips 56 mounted on the lower edges of the two cheek plates 33 and to suspend the heat booster 50 from the tread plate 30 by means of hanging chains 57, as shown in FIG. 5, to avoid independent handling of these elements and to prevent loss or displacement.

While a specific form of the improvement has been described and illustrated herein, it is to be understood that the same may be varied within the scope of the appended claims, without departing from the spirit of the invention.

Having thus described the invention what is claimed and desired secured by Letters Patent is:

1. A tire casing vulcanizer comprising: a vertical standard; a supporting arm extending outwardly and upwardly from each side of said standard; a mounting plate on the upper extremity of each arm; an arcuate, heated, inside curing mandrel fixedly mounted on and extending upwardly from each plate in parallel relation; a supporting member extending rearwardly from adjacent the upper extremity of said standard above said arms; a horizontal cross member carried by said supporting member rearward of said standard; a vertically movable hood supporting lever pivotally mounted on said cross member rearward of each mandrel and extending forwardly over the latter; a tread plate supported by each lever over each mandrel to be positioned over the tread portion of a casing; a pair of arcuate cheek plates pivotally suspended from each lever at the sides of the tread plate thereon to be positioned at each side of said casing; counterbalance means assisting said levers to lift said tread plates and said cheek plates above said mandrel; and means for drawing the cheek plates of each pair toward each other and toward said casing, said last mentioned means comprising a draw bar device extending slidably through the upper extremity of each supporting plate below and transversely of each mounting plate, an inner hook member affixed to the inner extremity of said device and adapted to engage an inner cheek plate, an outer hook block pivotally mounted adjacent the outer extremity of said device, a vise screw threaded through said outer hook block adapted to engage the corresponding outer cheek plate, said vise screw being adapted to be swung away from said outer cheek plate by pivotal movement of said outer hook block, each of said cheek members having a lower flange positioned to be engaged by said inner hook member and said vise screw, and a removable dowel pin for locking said outer hook member against pivotal movement in operative position.

2. The structure of claim 1 wherein an arcuate air bag is positioned between said casing and said cheek plates, resilient clip means on said cheek plates for supporting said air bag therebetween, and means carried by said standard for inflating said air bag.

References Cited in the file of this patent

UNITED STATES PATENTS

| | | |
|---|---|---|
| 1,477,267 | Killmer | Dec. 11, 1923 |
| 1,483,857 | Fitzharris | Feb. 12, 1924 |
| 1,903,025 | Browne | Mar. 28, 1933 |
| 2,538,149 | Fannen et al. | Jan. 16, 1951 |
| 2,797,438 | Robb | July 2, 1957 |
| 2,814,073 | Van Scoyk | Nov. 26, 1957 |
| 2,904,842 | Alm | Sept. 22, 1959 |

FOREIGN PATENTS

| | | |
|---|---|---|
| 15,248 | Australia | Sept. 3, 1929 |